July 22, 1930.  S. COHEN  1,771,206
TRAILER
Filed April 27, 1928   3 Sheets-Sheet 1

INVENTOR
Samuel Cohen
BY Parker & Burton
ATTORNEYS

July 22, 1930. S. COHEN 1,771,206
TRAILER
Filed April 27, 1928 3 Sheets-Sheet 2
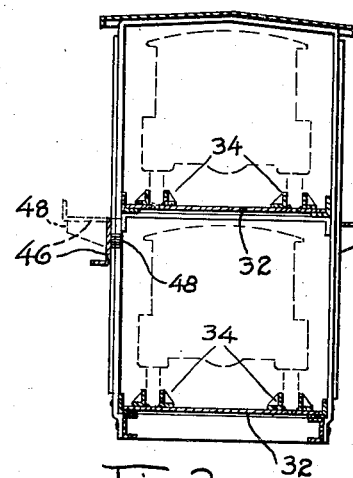
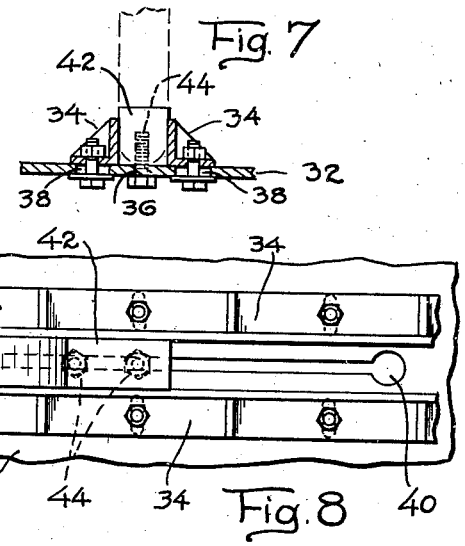
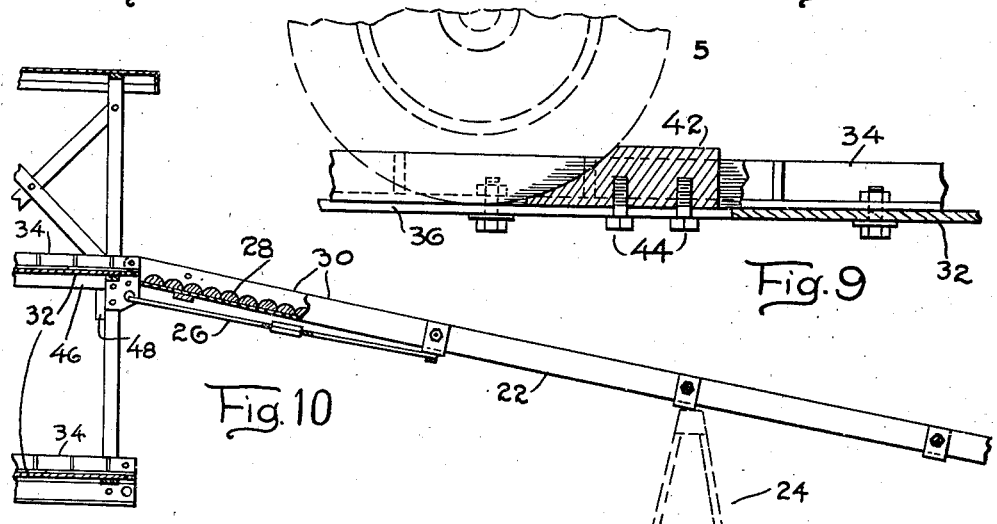
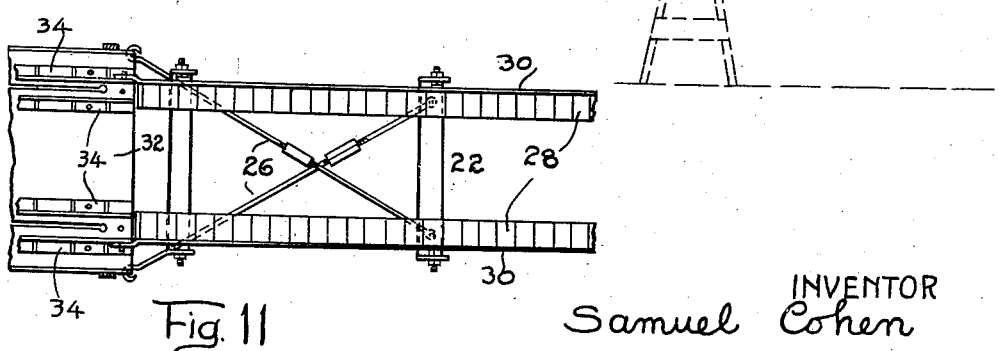
INVENTOR
Samuel Cohen
BY Parker & Burton
ATTORNEYS

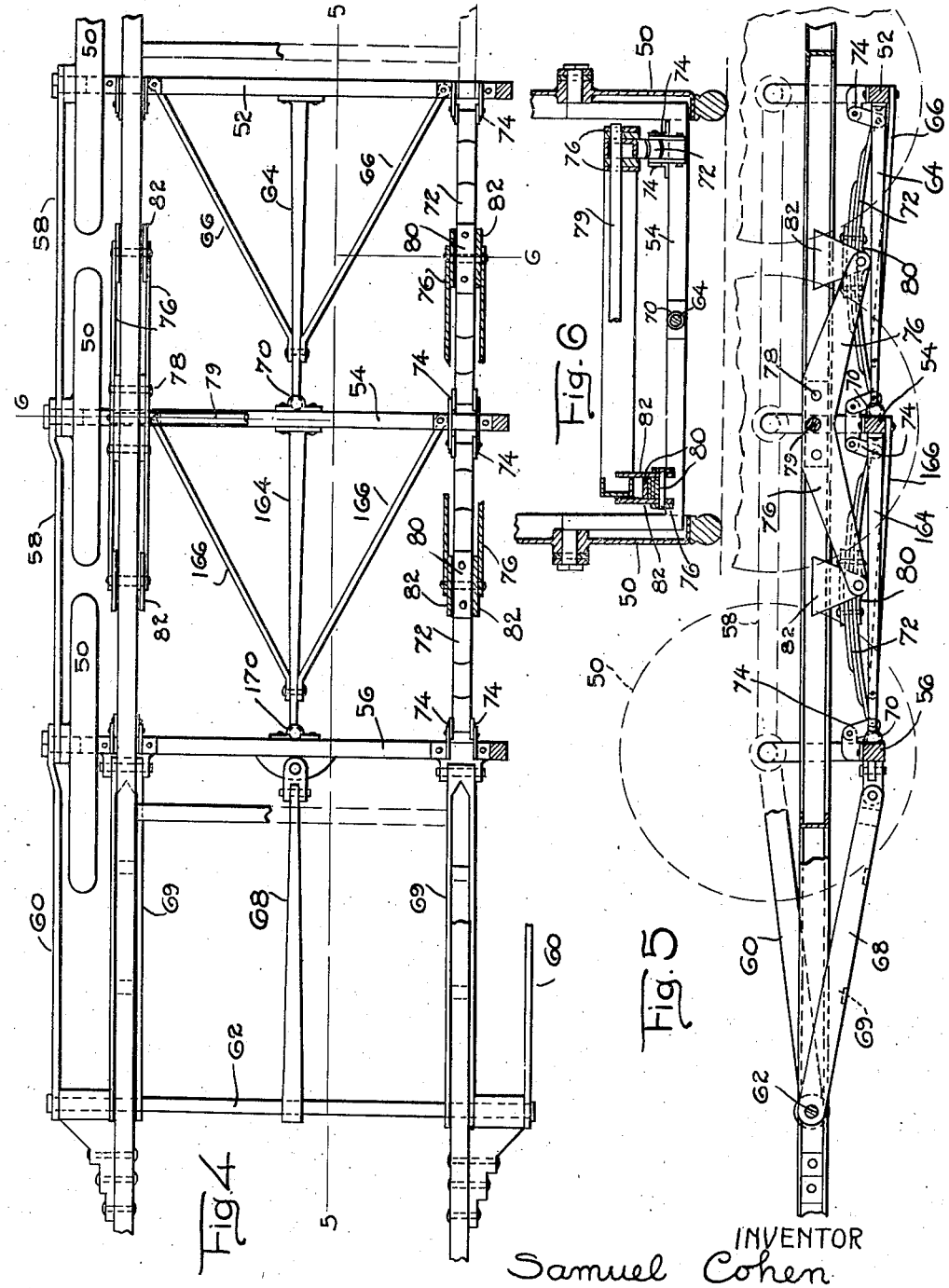

Patented July 22, 1930

1,771,206

UNITED STATES PATENT OFFICE

SAMUEL COHEN, OF DETROIT, MICHIGAN

TRAILER

Application filed April 27, 1928. Serial No. 273,188.

My invention relates to an improved trailer adapted to be employed in the transportation of motor vehicles.

My trailer is of such a character that it is capable of carrying a suitable number of motor vehicles which may be loaded thereon and unloaded therefrom under their own power. My trailer is particularly adapted for this purpose and its entire construction is arranged to facilitate the accomplishment of this end with the utmost saving of time and space upon the trailer itself.

The invention is embodied in a double deck trailer, each deck of which is provided with runways adapted to serve as tracks for motor vehicles, which runways are adjustable as to the tread of the vehicle and as to the width of the tire and are furthermore provided with adjustably positioned chock blocks to engage the vehicle wheels to support the vehicle. The forward deck overhangs the lower deck at the front end and the coupling member, which is adapted to be engaged with the cooperating part of the tractor, depends therebelow. The side walls are preferably skeletonized and runways are provided along each outer side of the vehicle for the use of an operator in the loading of the trailer.

My trailer is supported upon a novel truck construction comprising a plurality of pairs of road wheels, six being here shown, mounted upon drop center axles wherein the frame is swung upon a novel arrangement of springs and brackets so as to support the frame in such a manner as to have a low center of gravity and to facilitate the travel of the vehicle over the road.

Other objects, advantages and meritorious features of my invention will more fully appear from the following description, appended claims and accompanying drawing, wherein—

Fig. 3 is a vertical sectional view taken on line 3—3 of Fig. 1.
Fig. 4 is a plan of a six-wheel truck which supports the trailer frame and showing a portion of the frame in plan.

Fig. 5 is a longitudinal sectional view taken on line 5—5 of Fig. 4.

Fig. 6 is a transverse sectional view taken on line 6—6 of Fig. 4.

Fig. 7 is a transverse fragmentary sectional view through a wheel track.

Fig. 8 is a plan of a fragment of one of the wheel tracks.

Fig. 9 is a longitudinal sectional view through the track shown in Fig. 8.

Fig. 10 is an elevation partly in section of an inclined loading platform connected with the upper deck of the trailer, and

Fig. 11 is a plan of a fragment of the rear end of the trailer and such loading platform.

Figure 1:
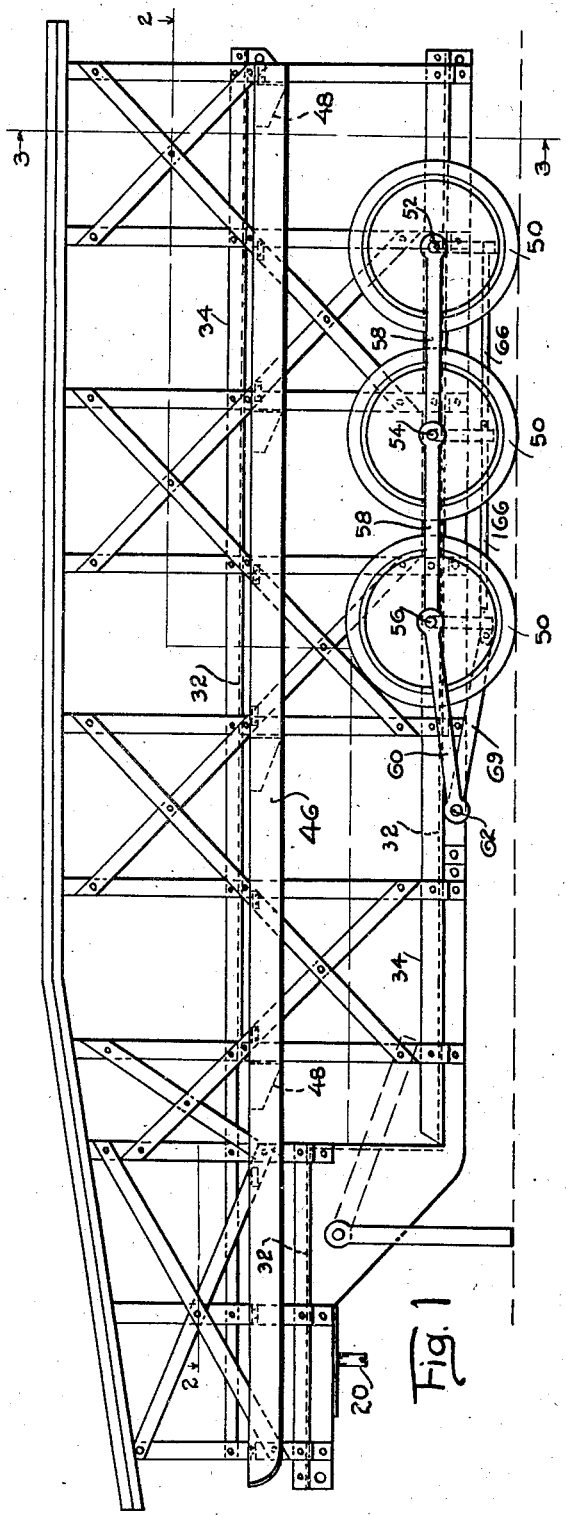
Fig. 1 is a side elevation of my trailer.
45

My improved trailer is adapted to be conventionally coupled with a tractor and I have shown a king-pin 20 in Fig. 1 which is adapted to be engaged in a suitable socket to effect such coupling.

The trailer comprises upper and lower decks. The upper deck overhangs at its forward end the lower deck. Each deck is adapted to receive a plurality of motor vehicles which may be run thereon under their own power, and for this purpose I have shown a suitable inclined loading platform 22, illustrated in Fig. 10 as supported upon a trestle 24 and connected at its forward end with the rear end of the trailer at a level with the second deck. Brace connections 26 are shown as bracing the platform laterally and the runways thereof are illustrated as formed of half round tread members 28 and side rails 30.

Each deck is here shown as comprising a floor plate 32 (Fig. 3) upon which is mounted channel tracks. Each channel track consists of a pair of side rails 34 here shown as being angular in cross section.

Figure 2:
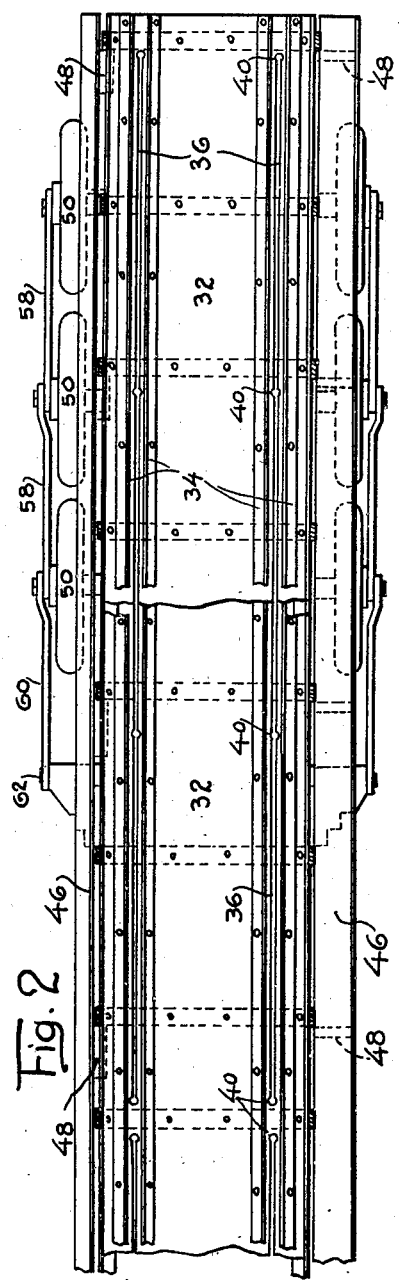
Fig. 2 is a sectional view, partly broken away, taken on line 2—2 of Fig. 1 showing the lower deck in a plan view.

The deck plate is provided with narrow longitudinally extending slots 36 which are spaced apart laterally and extend substantially parallel to each other and are arranged between the side rails 34 as shown in Figs. 2, 8 and 11. Arranged on opposite sides of the narrow lengthwise slots 36 are short transverse slots 38, so that the side rails may be moved laterally with respect to each other and with respect to the slot 36 to vary the width of the channel to accommodate road wheels of different widths and to vary the tread of the trackway so as to accommodate vehicles of different treads.

Chock blocks 42 are positioned within the channel trackways and are adjustable lengthwise therethrough to engage the wheels of the vehicle loaded thereon. These chock blocks are provided with securing screws 44 which extend through the slot 36 in the floor plate 32 and are operable to secure said chock blocks at adjusted positions linearly thereof. These chock blocks are entirely removable from the trackway and it will be noted that the narrow slot 36 in the floor plate is provided at intervals with enlargements 40 through which the heads of the screws might be passed if they were not completely removed.

In order to assist in positioning the chock blocks of the upper deck, and for other purposes, I provide a runway 46 which extends lengthwise of the trailer at a point approximately the upper deck and which is hinged to be dropped thereagainst as is illustrated in Fig. 3.

Supports 48 are likewise hinged to the side of the trailer to be swung outwardly to support said runways.

The trailer is supported upon a wheel truck which is here shown as comprising six road wheels 50 mounted upon drop center axles. I have shown a rear axle 52, a middle axle 54, and a forward axle 56, upon the ends of which road wheels 50 are supported. The ends of these axles beyond the road wheels are connected by torque members 58 and the ends of the forward axle are connected by a pair of torque members 60 to a transverse member 62 of the frame. The intermediate drop center sections of the axles are likewise connected.

I have here shown a torque member 64 braced by struts 66 connecting the rear axle with the intermediate section of the middle axle by a universal joint 70 and a torque member 164 braced by struts 166 connecting the middle axle with the intermediate drop center section of the forward axle by a universal joint 170. The middle of the forward axle is connected by a torque rod 68 with the middle of the transverse frame member 62 and the ends of the forward axle within the wheels is connected with the ends of frame member 62 as shown in Fig. 4.

The trailer frame is supported upon this truck by two pairs of springs 72. One pair of springs connects the middle axle with the forward axle and the other pair of springs connects the middle axle with the rear axle. The springs are shackled at their ends to the axles by shackles 74.

A pair of brackets 76 are secured to the frame member, one bracket being secured to one side of the frame and the other bracket being secured to the other side of the frame and each bracket, consisting of two sections, secured at its intermediate portion to the frame above the middle axle by suitable means such as bolts 78, so that the brackets extend in opposite directions from the middle axle substantially parallel to the frame but angularly downwardly therefrom. The opposite ends of the brackets are secured to the intermediate sections of the springs in a suitable fashion to support the frame thereupon. I have here shown spring plate and clip assemblies 80 used for this purpose and a pair of plates 82 are secured to the ends of the brackets and springs and extend on opposite sides of the side frame member. The center of gravity of the trailer is very low due to this particular construction, and the trailer is supported upon the truck in an efficient manner. A cross member 79 extends between the brackets 76.

What I claim is:

1. A double deck trailer having road wheels supported by drop center axles and having its lower deck swung within said axles and its upper deck extending beyond the forward end of the lower deck, a depending coupling member secured to the forward extremity of said upper deck, a pair of channelled runways extending throughout the length of each deck, chuck blocks adjustably mounted in each channel of each pair of runways, said channels in each of said runways being transversely adjustable to accommodate wheels of varying widths, and a platform pivotally secured along each side of the trailer on the level with the upper deck and extending throughout its length, said platform adapted normally to depend along the side of the trailer vehicle and provided with means for maintaining it in a horizontal position.

2. A double deck trailer having road wheels carried by drop center axles and having its lower deck swung within said axles below the center of the road wheels, the upper deck extending forwardly beyond the lower deck and provided therebeyond with a depending coupling member, a runway extending along the length of each deck and comprised of transversely adjustable channel members, means for securing component channels of each runway in any adjusted position, spaced apart means along the length of each runway adapted to cooperate with a removable chuck block to secure same in an adjusted position, and means pivotally secured along each outer wall of the trailer on a level with the upper deck for providing access to the adjustable features of the runway.

3. A double deck trailer having road wheels carried by drop center axles and having its lower deck swung within said axles below the center of the road wheels, the upper deck extending forwardly beyond the lower deck and provided therebeyond with a depending coupling member, a runway extending along the length of each deck and comprised of transversely adjustable channel members, means for securing component channels of each runway in any adjusted position, spaced apart means along the length of each runway adapted to cooperate with a removable chuck block to secure same in an adjusted position, and means pivotally secured along each outer wall of the trailer on a level with the upper deck for providing access to the adjustable features of the runway, and means pivotally secured to the frame of the lower deck for maintaining the trailer vehicle in horizontal position when uncoupled from its tractor.

In testimony whereof, I, SAMUEL COHEN, sign this specification.

SAMUEL COHEN.